UNITED STATES PATENT OFFICE.

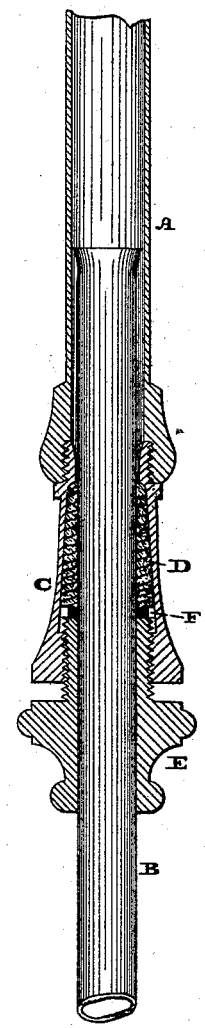

LOUIS BRAUER, OF PHILADELPHIA, PENNSYLVANIA, ASSIGNOR OF ONE-HALF HIS RIGHT TO CARL SAAKE, OF SAME PLACE.

IMPROVEMENT IN EXTENSION-CHANDELIERS.

Specification forming part of Letters Patent No. 219,682, dated September 16, 1879; application filed May 7, 1879.

*To all whom it may concern:*

Be it known that I, LOUIS BRAUER, of the city and county of Philadelphia, and State of Pennsylvania, have invented a new and useful Improvement in Extension-Chandeliers or Slide-Lights, which improvement is fully set forth in the following specification and accompanying drawing, in which the figure is a longitudinal section of the portion of a chandelier or slide-light embodying my invention.

My invention consists in providing the joints of chandelier extension-pipe with spiral tapering fibrous packing inclosed in an internally-tapering nut, said packing being provided with a washer to prevent turning on the pipe, and clamped by a compressing and adjusting collar.

Referring to the drawing, A and B represent the fixed and sliding pipes, respectively, of an extension-chandelier or slide-light. At the lower end of the pipe A is a casing or enlargement, C, between which and the pipe B is packing D, which consists of fibrous material wound around said pipe B, and closes the joint between the pipes A and B. This packing is wound spirally about said pipe B in regular coils, and decreases in thickness regularly from bottom to top. The casing or enlargement C, which incloses it, has a corresponding internal upward taper, so that there is a certain wedge-like action between the engaging faces of said casing and packing. This may be increased by the compressing action of collar E against the base of said packing. Nothing is interposed except washer F. I employ no spring in any part of my device.

E represents a screw-collar, which encircles the pipe B, and engages with threads on the lower end of the casing C, and is adapted to bear against a metallic or other hard washer, F, interposed between the packing D and the collar E.

The operation is as follows: The sliding pipe B is raised or lowered the proper extent relatively to the desired height of the burner or fixture attached to the pipe. The packing D in no wise interferes with the free movements of the sliding pipe, but closes the joint in the casing C, whereby gas is prevented leaking thereat.

Should the friction of the packing be insufficient to sustain the pipe B and connected parts, the collar E is properly turned so as to compress the packing, the expansion whereof increases the friction on the pipe, the effect whereof is evident.

Should the friction of the packing be too great, the collar is turned or lowered, so as to remove a proper degree of pressure on the packing, whereby the power of the packing is decreased, and the sliding pipe may be moved with greater freedom.

The fibrous packing may be readily replaced when worn and lubricated when desired, and, while the adjustment of the compression is readily obtained by operation of the collar E, twisting or turning of the packing by such operation is prevented by the washer F, which, as has been stated, is interposed between the packing and collar.

I am aware that extension-chandeliers or drop-lights have heretofore been constructed in sections, one section being provided with a casing or enlargement, and the other with fibrous packing and a compressing-nut, the packing being within the casing when the two sections are joined together.

Drop-lights thus constructed are similar in general arrangement to mine, but lack the tapering construction of the packing and of the interior of the casing.

The advantages of this tapering construction have been already pointed out in this specification.

Having thus described my invention, what I claim as new, and desire to secure by Letters Patent, is—

1. In combination with pipes A and B and tapering shell C, the tapering fibrous packing D, wound spirally around pipe B within shell C, and the adjusting-collar, E, operating directly against the base of said tapering packing.

2. In combination with pipes A and B and tapering shell C, the tapering flexible packing D, compressing-collar E, and washer F, substantially as set forth.

LOUIS BRAUER.

Witnesses:
JOHN A. WIEDERSHEIM,
A. P. GRANT.